Feb. 10, 1953 — M. E. PALSGROVE ET AL — 2,628,127
TILTABLE DUMP BED CONSTRUCTION FOR WAGONS AND TRAILER VEHICLES

Filed Feb. 23, 1950 — 2 SHEETS—SHEET 1

INVENTORS
*Merlin E. Palsgrove*
*Maurice W. Palsgrove*

By *W. S. McDowell*
ATTORNEY

Patented Feb. 10, 1953

2,628,127

UNITED STATES PATENT OFFICE 2,628,127

TILTABLE DUMP BED CONSTRUCTION FOR WAGONS AND TRAILER VEHICLES

Merlin E. Palsgrove, Columbus, and Maurice W. Palsgrove, Canal Winchester, Ohio

Application February 23, 1950, Serial No. 145,706

2 Claims. (Cl. 298—19)

This invention relates to dump vehicles, having particular reference to a novel form of operating mechanism for effecting the dumping of the body contents of vehicles such as carts, wagons and trailers after such vehicles have been detached from associated tractors, draft animals or other prime movers.

The invention is of particular usefulness on a farm, where, for example, wagon loads of produce or the like are brought in from the fields and are to be deposited in piles or into loading conveyors. The present forms of dumping vehicles, such as dump trucks, do not lend themselves readily to operations of this kind, and if the conveying vehicles are unloaded by hand operations, considerable time and labor are involved.

An object of the present invention, therefore, is to provide an improved means of a manually operated nature for dumping the contents of a wagon or other wheeled vehicle in a simple and expeditious manner and without involving the aid of motor or engine-developed power.

Another object is to provide such a means in the form of a simple and economical mechanism which may be incorporated in the supporting framework or bed of the vehicle itself.

These objects are accomplished in a very satisfactory manner by a mechanism which causes a dump body-supporting bed or frame to pivot about a rear axle, the front of the vehicle rising to a height sufficient to provide the necessary dumping angle of the body, the mechanism comprising advantageously a frame supported for pivotal movement about the rear axle of the vehicle together with a manually operated and threaded actuating mechanism so mounted that upon actuation thereof, oscillatory motion may be imparted to said frame to rock the latter between body-dumping and normal positions on the vehicle bed.

Other objects and advantages of the invention will be apparent by reference to the following specification, claims and accompanying drawings.

Figure 1:
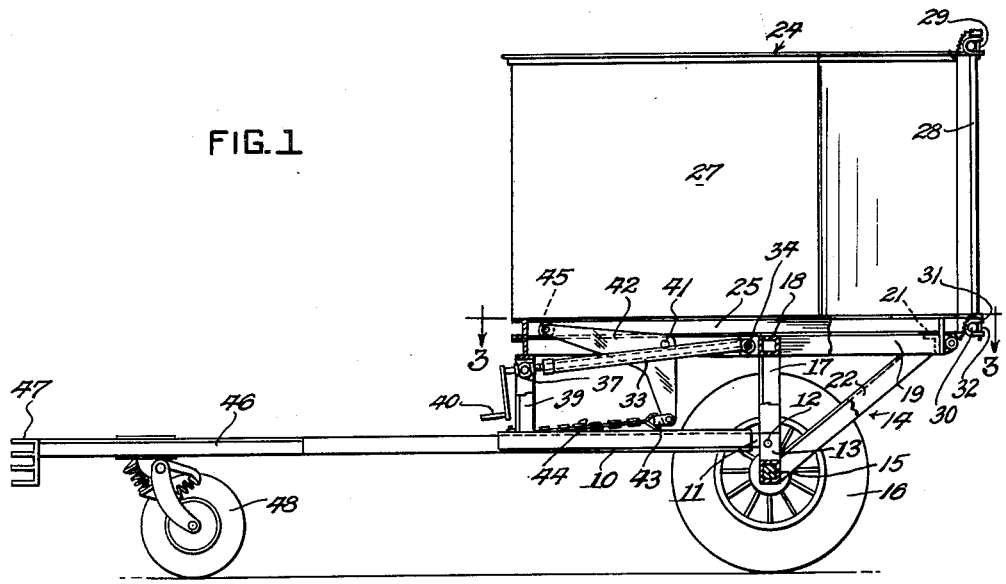
Fig. 1 is a side elevational view of a vehicle incorporating the dumping mechanism of the present invention and showing the sub frames of the vehicle in vertical section.

Referring more particularly to the drawings, and especially the form of our invention disclosed in Figs. 1 through 5, our improved dumping vehicle comprises a bed or under-frame 10, preferably formed from a pair of rigidly united structural steel members. At its rear, the bed 10 includes ears 11 which are pivotally joined as at 12 to upstanding bracket members 13 carried by a tiltable and superposed body-carrying frame 14.

The frame 14 is also composed of rigidly united structural steel members, embodying an axle 15 which rotatably carries at the opposite ends thereof a pair of rearwardly disposed ground-engaging wheels 16. Rigidly joined with and arising from the axle 15 are upright frame members 17 which at their upper ends are welded or otherwise rigidly joined with a transverse frame member 18 disposed in parallel relationship with the axle 15, the latter constituting a part of a substantially rectangular frame assembly involving parallel longitudinally extending side members 19 and transverse front and rear members 20 and 21, respectively. The frame 14 further includes diagonally extending rear struts 22 which are arranged rigidly between the axle 15 and the rear portions of the side members 19.

Figure 2:
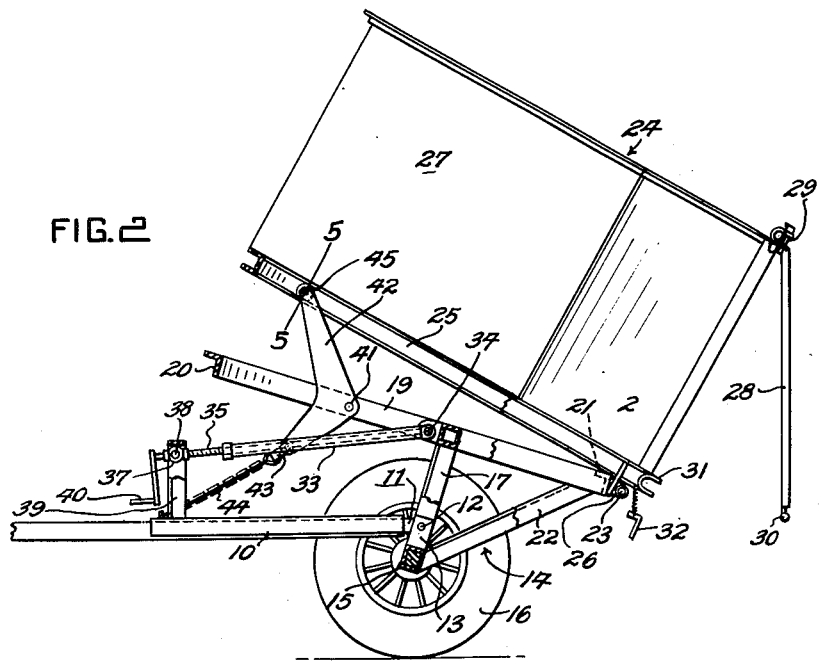
Fig. 2 is a similar view disclosing the mechanism in a position in which the body of the vehicle is adjusted to assume a contents-dumping position.
Figure 3:
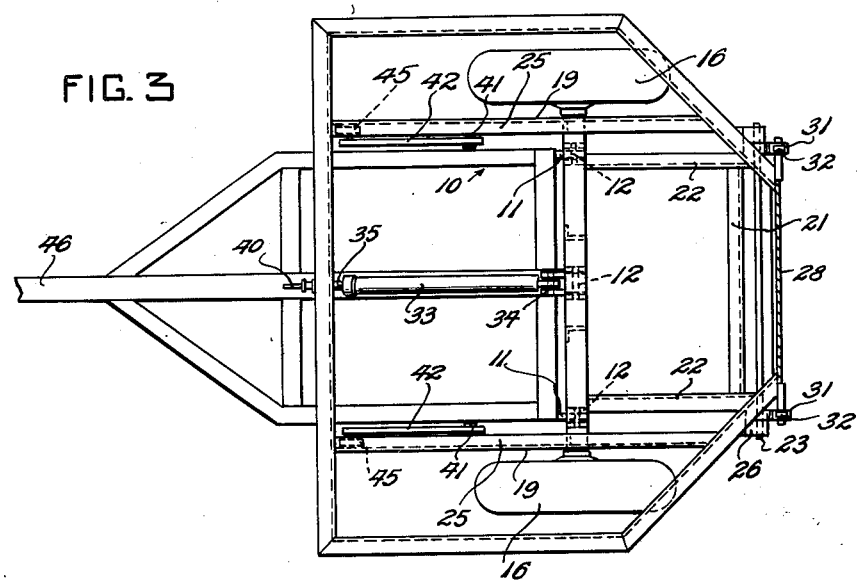
Fig. 3 is a top plan view of the vehicle frame, the parts being shown in horizontal section, as indicated by the line 3—3 of Fig. 1.
Figure 4:
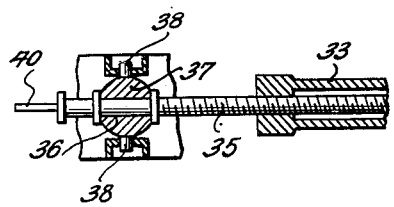
Fig. 4 is a detail sectional view of the screw-actuated mechanism employed in one form of our invention for controlling the tilting of the cart body.

By this construction, the body-supporting frame may swing about the axis defined by the pivotal connections 12 which unite the rear portion of the bed 10 with the frame 14, the latter turning about said pivotal connections from its normal position as viewed in Fig. 1 to a body-tilting and dumping position, as illustrated in Fig. 2.

The rear portion of the frame 14 carries a rod 23 which serves as a pivotal axial support for the rear end of a dump body 24. The lower part of this body provides a reinforcing frame composed of longitudinally extending sills 25, and the rear portions of these sills carry brackets 26 having fulcrumed engagement with the rod 23, by which the dump body may turn as a whole about the axis 23, as shown in Fig. 2.

The body 24 includes vertical sides 27, a bottom, a front, an open top and a rearwardly disposed vertical door 28, the door being pivoted as at 29 along its upper edge to the upper and rearward part of the body 24. The lower free edge of the door is formed with studs 30 which are receivable in U-shaped brackets 31 carried by the bottom of the dump body. The open ends of these brackets are adapted to be closed by means of removable pins 32, by means of which the studs 30 are held in positions maintaining the door 28 in its position of body closure. By removing the pins 32, the door may swing to its open position, as disclosed in Fig. 2, providing for the dumping of the contents of the wagon body when the body frame 14 is tilted to effect such dumping.

The tilting action is obtainable by providing the frame 14 with an internally threaded cylinder 33, the rear end of the latter being pivoted as at 34 to the frame 14. The cylinder is adapted to receive an externally threaded rod 35, the forward part of this rod being journaled as at 36 in a rockable bearing 37 which is supported by trunnions 38 in connection with a bracket 39 carried by and arising stationarily from the bed 10. The extreme forward end of the rod 35 may be equipped with a manually operated crank handle 40 by means of which the rod 35 may be rotated, such rotation resulting in extending or contracting the combined effective length of the cylinder 33 and the rod 35 thus providing a longitudinally extensible jack. When contracted, as viewed in Fig. 1, the parts of the vehicle frame are positioned normally, but when extended, the frame 14 is rocked about its pivotal connection with the rear of the vehicle bed to cause the body 24 to assume its dumping position.

To enable the front end of the body to be raised to a greater degree in order that the body may be tilted to secure an efficient dumping angle providing for the proper gravitational discharge of the contents of the body through the openable rear end thereof, there is pivotally mounted as at 41 in connection with the side members 19 of the frame 14 a plurality of substantially triangular plates 42 which also may be in the form of bell crank levers. The lower corners of these plates are fastened as at 43 to the rear ends of chains 44, the forward ends of said chains being fastened in a suitable stationary manner to the bed 10. The plates 42 at their normal forward ends are equipped with rollers 45 which operate in guides formed by the side members 19.

Figure 6:
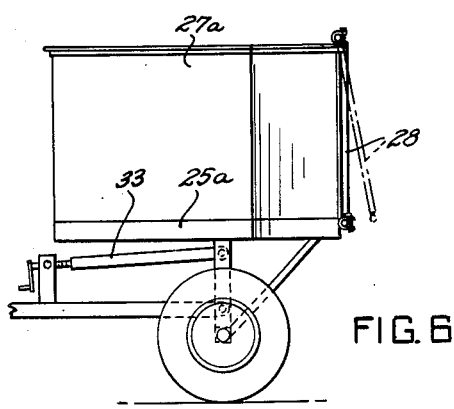
Fig. 6 is a side elevational view, showing a modified form of a dumping cart formed in accordance with the present invention.

With this arrangement, when the frame 14 is raised from the position disclosed in Fig. 1 to that of Fig. 2, the motion thereof will rock the plates 42, causing the rollered ends of said plates to elevate the front end of the body to a greater extent than that obtained by the structure disclosed, for example, in Fig. 6, in which the plates 42 are omitted. An increased angle of tilt is thus obtained on the part of the body 24, providing correspondingly for an improved gravitational dumping action of the contents thereof.

In this instance, the extreme forward end of the bed 10 includes a reach member 46 adapted to be coupled as at 47 to a draft vehicle or other source of propelling power used in moving the vehicle from one location to another. The reach member may be equipped with a turnable caster 48, if desired, to impart stability to the bed 10. The caster may be of the type utilizing spring means in absorbing road thrusts.

Figure 7:
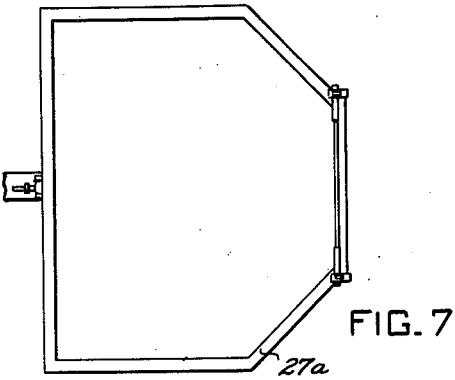
Fig. 7 is a top plan view of the structure disclosed in Fig. 6.
Figure 5:
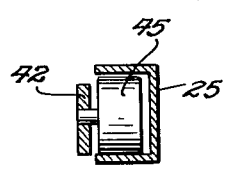
Fig. 5 is a detail sectional view on the line 5—5 of Fig. 2.

In the construction disclosed in Figs. 6 and 7, the body 27a is fixed to the frame sills 25a, so that the body 27a swings in unison with the sills 25a in response to the operation of the screw-actuated mechanism 33.

It will be understood that various other changes or modifications may be made in our improved tilting cart construction within the scope of the following claims.

We claim:

1. In a dump cart; a bed frame having means at one end thereof for attachment to a prime mover; a body-supporting frame including a flat portion disposed above said bed frame and a depending portion extending below said bed frame at the opposite end thereof; ground wheels rotatably carried by the depending portion of said body-supporting frame below said bed frame; a body pivotally carried on said body-supporting frame for tilting movement in a vertical plane with respect to said body-supporting frame; means pivotally connecting the depending portion of said body-supporting frame between said ground wheels and said body with the opposite end of said bed frame and providing for rocking movement of said body-supporting frame, said body and said ground wheels in a vertical plane parallel to the longitudinal axis of said bed frame; manually operable, longitudinally extensible jack means pivotally connected between said bed frame and said body-supporting frame for imparting rocking movement to said body-supporting frame; and a bell crank lever pivotally connected intermediate its ends with said body-supporting frame and having one end connected with said bed frame and its opposite end slidably connected with said body, said bell crank lever being operable, upon rocking movement of said body-supporting frame, to pivot said body relative to said body-supporting frame.

2. In a dumping vehicle; a bed frame provided at one end with a coupling for attachment to a prime mover; a body-supporting frame including a flat portion disposed above said bed frame and a depending portion extending below said bed frame at the opposite end thereof; ground wheels rotatably carried by the depending portion of said body-supporting frame below said bed frame; a body pivotally connected with said body-supporting frame for tilting movement in a vertical plane with respect to said body-supporting frame, said body being provided on each side thereof with a pair of channeled guideways; means pivotally connecting the depending portion of said body-supporting frame with the opposite end of said bed frame for tilting movement in a substantially vertical plane; manually operable, longitudinally extensible means connected directly between said bed frame and said body-supporting frame and operable to tilt said body-supporting frame relative to said bed frame; and a pair of bell crank levers pivotally connected intermediate their ends on either side of said body-supporting frame and having one end thereof linked to said bed frame and the opposite ends thereof extending within the channeled guideways of said body, said bell crank levers serving upon tilting movement of said body-supporting frame to tilt said body to an angular position with respect to said body-supporting frame.

MERLIN E. PALSGROVE.
MAURICE W. PALSGROVE.

REFERENCES CITED

The following references are of record in the file of this patent:

UNITED STATES PATENTS

| Number | Name | Date |
|---|---|---|
| 798,566 | Carroll | Aug. 29, 1905 |
| 1,466,919 | Winans | Sept. 4, 1923 |
| 1,843,852 | Troy | Feb. 2, 1932 |
| 1,967,568 | Wright | July 24, 1934 |

FOREIGN PATENTS

| Number | Country | Date |
|---|---|---|
| 653,342 | France | Mar. 20, 1929 |
| 276,054 | Germany | July 3, 1914 |
| 3,528 | Great Britain | Mar. 5, 1890 |